United States Patent [19]

Checkley et al.

[11] 4,318,660
[45] Mar. 9, 1982

[54] WORK TRANSFER ASSEMBLY

[75] Inventors: David L. Checkley, Howell; Larry W. Renton, Livonia, both of Mich.

[73] Assignee: Atmosphere Furnace Company, Wixom, Mich.

[21] Appl. No.: 140,518

[22] Filed: Apr. 15, 1980

[51] Int. Cl.³ ............................................. B65G 25/10
[52] U.S. Cl. .................................... 414/518; 414/156; 414/525 R; 104/162; 104/172 B; 198/385; 198/586
[58] Field of Search .................. 414/518, 525 R, 152, 414/156, 159, 215; 104/48, 162, 172 R, 172 B; 198/574, 586, 365, 372

[56] References Cited

U.S. PATENT DOCUMENTS

| 2,940,619 | 6/1960 | Schramm et al. | 414/152 X |
|---|---|---|---|
| 3,504,781 | 4/1970 | Lehmann et al. | 104/162 |
| 3,677,423 | 7/1972 | Tollefsrod et al. | 414/525 X |
| 3,882,792 | 5/1975 | McIntier | 198/574 X |
| 4,170,292 | 10/1979 | Lang | 104/162 X |

FOREIGN PATENT DOCUMENTS 1184371 12/1964 Fed. Rep. of Germany ... 104/172 B

*Primary Examiner*—Leslie J. Paperner
*Assistant Examiner*—Terrance L. Siemens

*Attorney, Agent, or Firm*—McGlynn and Milton

[57] ABSTRACT

A work transfer assembly including a transfer car movable along a path for transporting a workpiece carrier between separate processing stations positioned along the path. The car includes a push-pull chain made up of a plurality of links with one of the links defined by a pair of spaced support plates having upwardly extending support flanges interconnected by a shaft which rotatably supports a coupler member. The coupler member is a single unitary member having a pair of side plates interconnected by an abutment plate below which is an L-shaped plate defining a hook. The coupler member is rotatably supported for movement between a hook position with the hook in position for hooking a tray for removing the tray from a station and an abutment position with the abutment plate in position for abutting the tray for pushing the tray into the station. The coupler member is counterweighted so that it moves to the hook position and ball detent assemblies are included to retain the coupler member in the abutment position. The coupler member also includes a cam plate extending downwardly centrally thereof for engaging the tooth of a sprocket about which the chain is entrained whereby the sprocket removes the coupler member from the ball detents and rotates the coupler to the hook position.

25 Claims, 5 Drawing Figures

WORK TRANSFER ASSEMBLY

BACKGROUND OF THE INVENTION

1. Field of the Invention

The subject invention relates to a work transfer assembly for the type including a transfer car movable along a path defined by a track for transporting a workpiece carrier tray between separate processing stations positioned adjacent one another along the path. Equipment of this type is commonly used in metal heat treating facilities in which a number of work-processing stations are located along opposite sides of a set of tracks along which the transfer car moves. The transfer car transports a workpiece carrier tray as the car moves along the tracks until the car is aligned with the desired processing station. The tray is then mechanically pushed into the processing station and subsequently withdrawn after the processing station has accomplished the treatment of the parts on the tray.

2. Description of the Prior Art

The transfer cars typically include a chain entrained about sprockets for movement laterally of the direction of movement of the car for moving the workpiece carrier trays into and out of processing stations. Such chains typically include some sort of head which will push the tray from the transfer car into the processing station while in one mode and will retract the workpiece carrier tray from the processing station while in another mode. Such assemblies include numerous working components which must coact together to perform the desired pushing and pulling functions and, due to their complexity, are expensive to manufacture and are susceptible to damage and/or malfunction.

SUMMARY OF THE INVENTION

The subject invention relates to a coupling assembly used in a work transfer assembly including transfer car means movable along a path for transporting a workpiece carrier tray between separate processing stations positioned along the path with the car means including push-pull means for moving a tray in directions laterally of the path to move the tray into and out a processing station. The push-pull means includes a single unitary coupler member having a push abutment for abutting a tray to push the tray from the car means to a station and a pull hook for hooking a tray to pull the tray from a station to the car means and rotatable between a hook position with the pull hook in position for hooking a tray and an abutment position with the push abutment in position for abutting a tray with the pull hook in a non-tray-engaging position.

PRIOR ART STATEMENT

Typical of the work transfer assemblies known in the prior art are those shown in U.S. Pat. No. 3,677,423 granted July 18, 1972 to Tollefsrud et al and U.S. Pat. No. 2,940,619 granted June 14, 1960 to Schramm et al. The coupling assemblies disclosed in both of these patents are multipart assemblies with one part performing the pushing function and another part performing the pulling function. The subject invention relates to an improvement wherein a single unitary coupler member both pushes and pulls the workpiece carrier tray and is, therefore, simpler, less complex and otherwise more satisfactory than known coupling assemblies.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
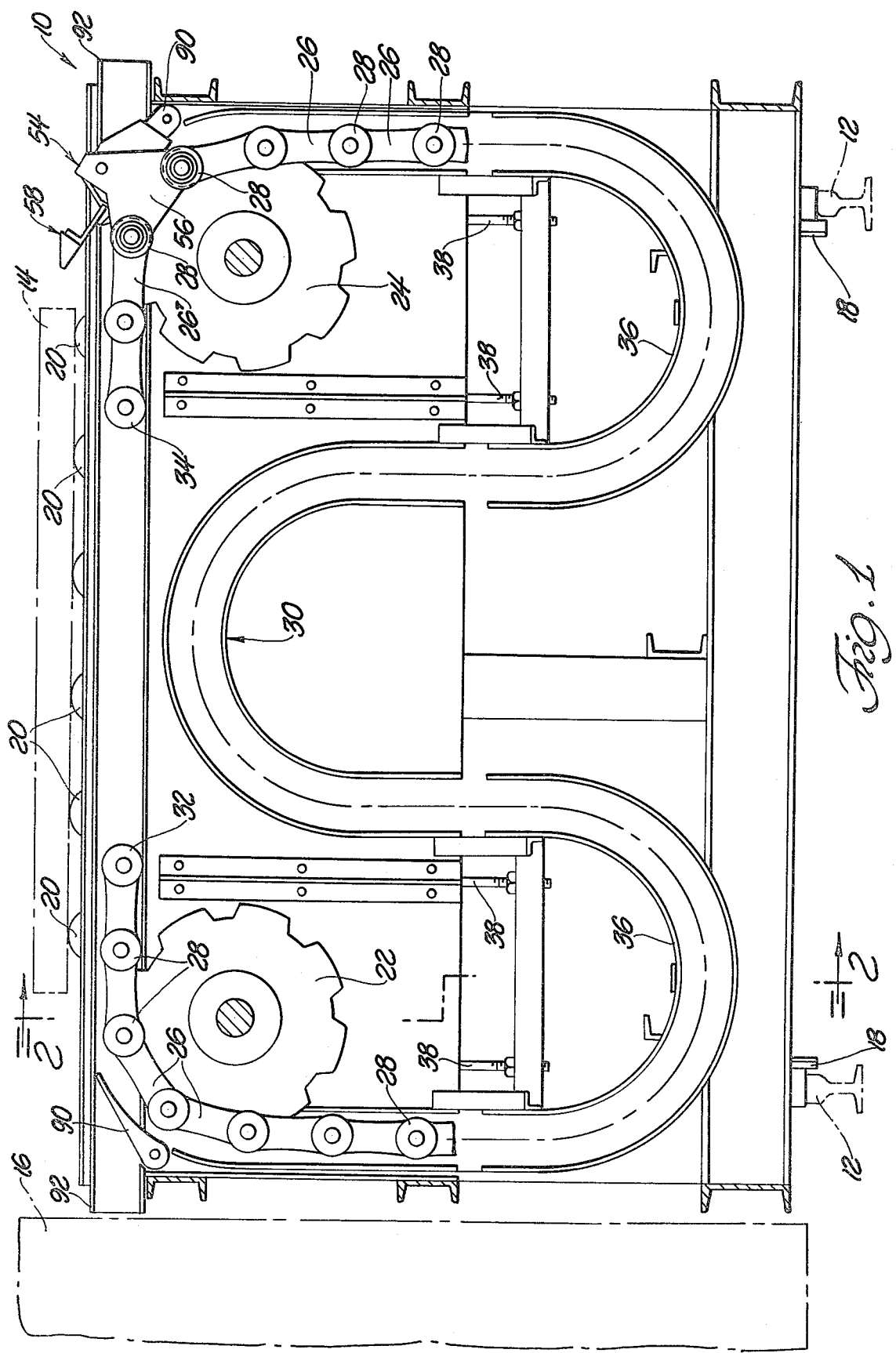
FIG. 1 is a side-elevational view partially broken away and in cross section of a transfer car utilized in the subject invention.
Figure 2:
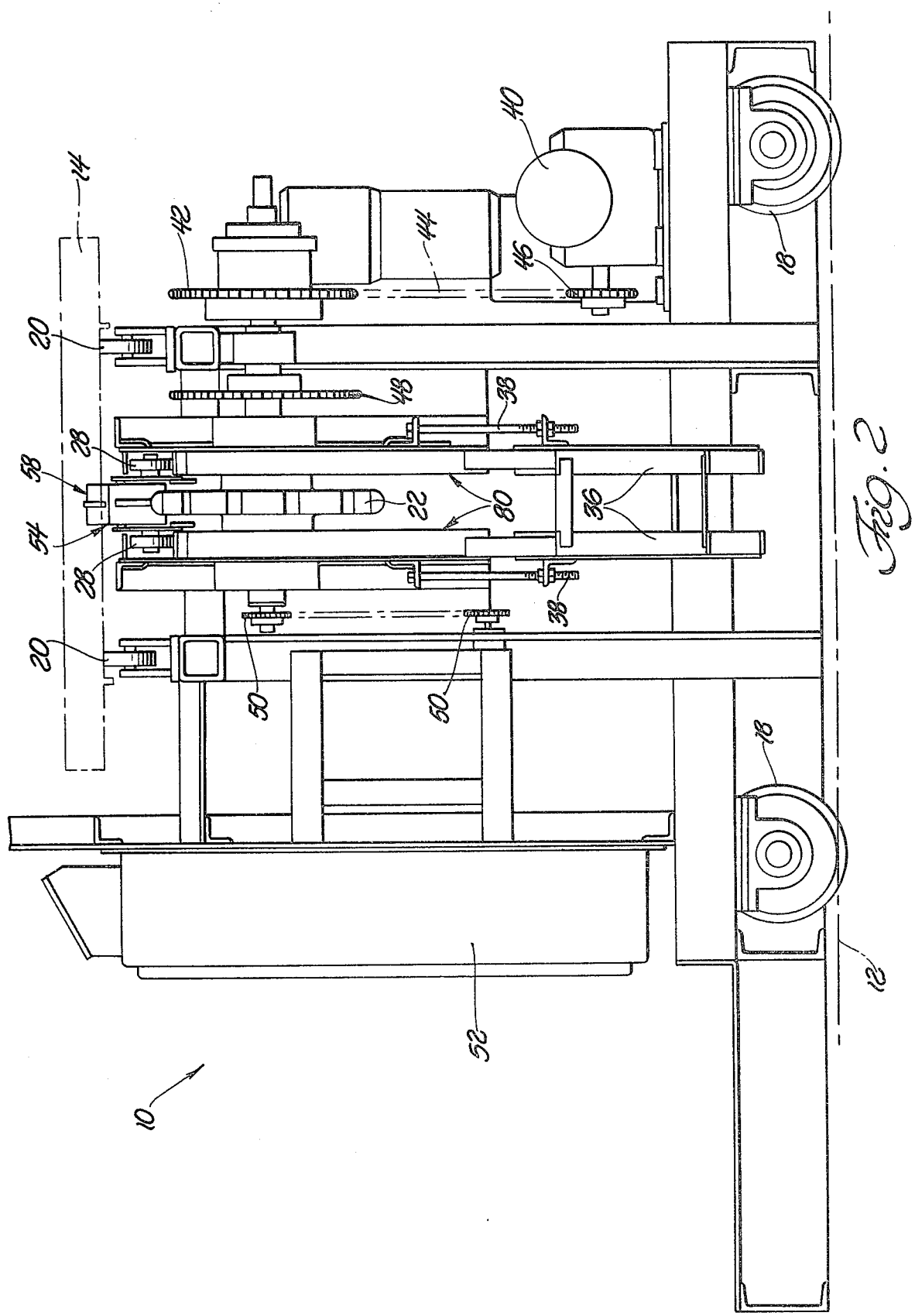
FIG. 2 is an end view of the transfer car taken substantially along line 2—2 of FIG. 1.
Figure 3:
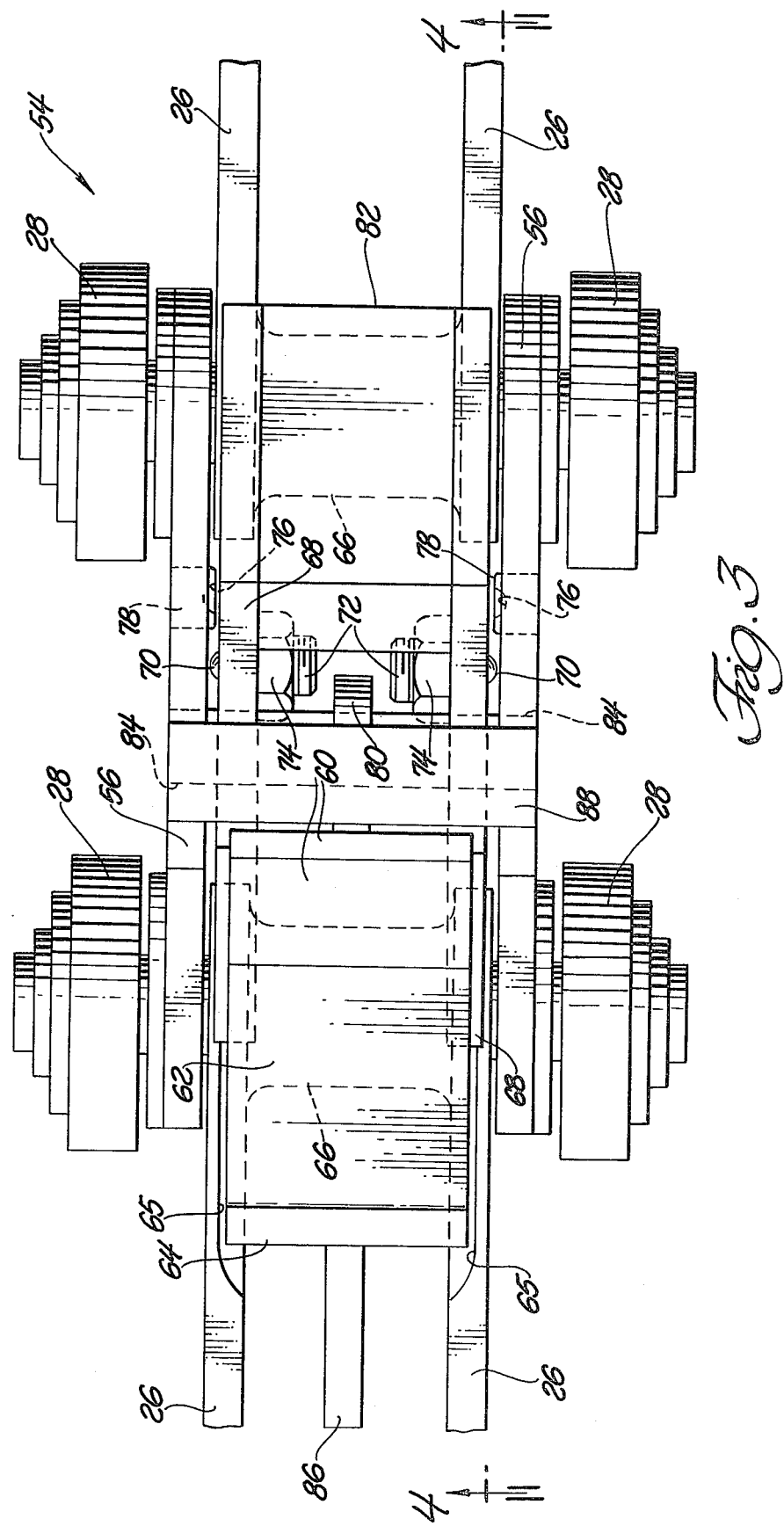
FIG. 3 is a top plane view of the coupling assembly constructed in accordance with the subject invention.

The work transfer assembly of the subject invention is generally shown at 10 in FIGS. 1 and 2.

The assembly 10 is a transfer car means movable along a path defined by the rails 12 for transporting a workpiece carrier tray 14 between separate processing stations, one of which is shown at 16 in FIG. 1. The processing stations are positioned adjacent to one another along the path defined by the rails 12. The transfer car includes a plurality of interconnected structural members and beams which, in turn, are supported by the rail wheels 18 which ride along the rails 12.

The car includes a plurality of rollers 20 rotatably supported by a pair of parallel and spaced rails at the top of the transfer car for forming a conveyor for rollingly supporting the workpiece carrier tray 14.

The transfer car includes push-pull means for moving the tray 14 in directions laterally of the path defined by the tracks 12, i.e., parallel to the opposite sides of the transfer car and over the ends thereof, to move the tray 14 in and out of a processing station 16. The push-pull means includes a plurality of two sprockets 22 and 24 rotatably supported by the framework of the transfer car and a chain comprising a plurality of rotatably connected or articulated links 26 entrained about the sprockets 22 and 24. The adjacent links 26 of the chain are interconnected by a shaft and exteriorly thereof the shafts support rollers 28 as best shown in FIG. 2 and in FIG. 1. The rollers 28 move along a track generally indicated at 30. The chain has spaced ends 32 and 34. The spacing between the ends 32 and 34 of the chain may be adjusted by vertical movement of the track portions 36 which may be vertically adjusted by the adjustment bolts 38.

A motor assembly 40 rotates shaft sprocket or gear 42 via a chain, or the like, 44 from sprocket or gear 46. A sprocket 42 is connected to the drive shaft for the sprocket 22 for rotating same. A timing chain sprocket 48 is connected to a similar timing sprocket on the shaft rotating the sprocket 24 for assuring that the sprockets 22 and 24 remain timed with one another by rotating exactly at the same rpm and in the same direction. Control sprockets 50 are interconnected by a chain and send signals to a control panel 52 which controls the sequencing and direction of rotation of the motor 40 and, hence, the sprockets 22 and 24 for moving the tray 14 into and out of a processing station.

Figure 4:
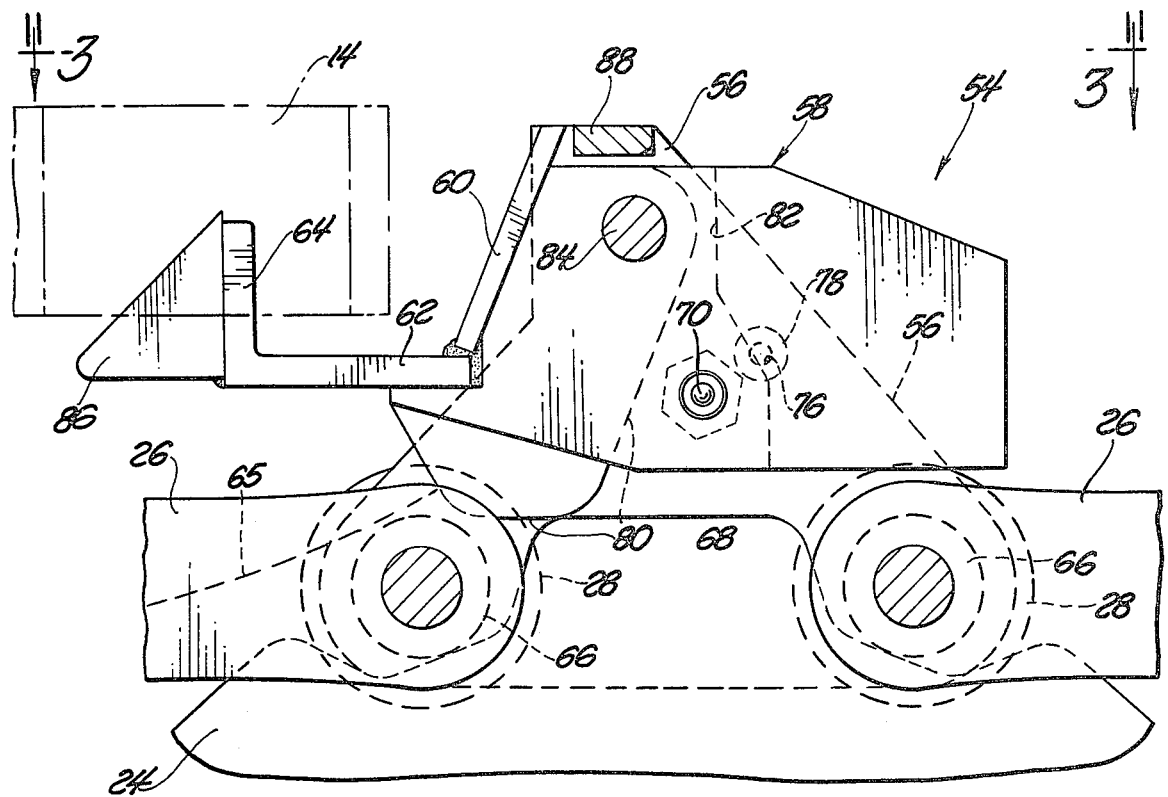
FIG. 4 is a fragmentary cross-sectionl view taken substantially along line 4—4 of FIG. 3.
Figure 5:
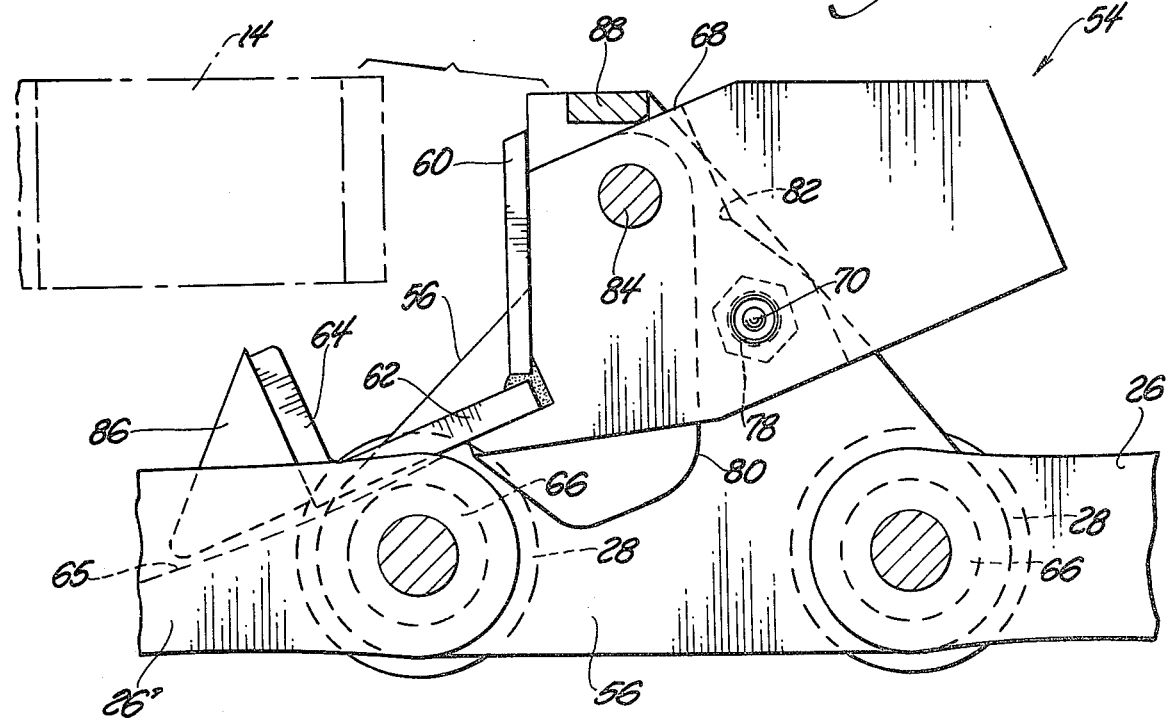
FIG. 5 is a view similar to FIG. 4 but showing the coupling assembly in a different position.

The push-pull means of the transfer car include a coupling assembly generally indicated and shown at 54 for moving the tray 14 into and out of the processing station 16 from the transfer car. Each of the links 26 of the chain comprise a pair of spaced plates, the ends of which are rotatably connected by a shaft to the next adjacent links in the same fashion as a bicycle chain only of much larger size. One of the links in the chain forms a part of the coupling assembly and is defined by a pair of spaced support plates 56 which have upwardly extending support flanges. The upwardly extending support flanges of the support plates 56 rotatably support a single unitary coupler member generally indicated at 58. The coupler member 58 has a push abutment defined by the abutment plate 60 for abutting a tray 14 to push the tray 14 from the transfer car to a processing station. The coupler member 58 includes a pull hook defined by the L-shaped plate having a long leg 62 and a short leg 64 for hooking a tray 14 to pull the tray 14 from a processing station to the transfer car. The links 26 just forward of the coupler member 58 are scalloped or recessed at 65 to allow clearance for the L-shaped member 62, 64 to move to the abutment position as shown in FIG. 5. The single unitary coupler member 58 is rotatably supported by the support flanges of the support plates 56 for rotation between a hook position with the pull hook 62, 64 in position for hooking a tray as illustrated in FIG. 4 and an abutment position with the abutment plates 60 in position for abutting a tray 14 with the pull hook 62, 64 in a nontray-engaging position as illustrated in FIG. 5. The coupler member 58 is rotatably supported by and between the upper support flanges of the support plates 56.

The sprockets 22 and 24 include sprocket teeth and rollers 66 are disposed on the shaft or pins rotatably interconnecting adjacent links for engaging the spaces between the sprocket teeth.

The coupler member 58 includes a pair of spaced side plates 68. The abutment plate 60 interconnects the front ends of the side plates 68 as by being welded thereto. The long leg 62 of the L-shaped plate interconnects the side plates 68 at the bottom of the abutment plate 60 by being welded thereto. The long leg 62 extends forwardly to the upwardly extending short leg 64 which is perpendicular to the long leg 62 and defines the pull hook. The short leg 64 defining the pull hook defines the forward extremity of a pocket, the bottom of which is defined by the long leg 62 and the rearward extremity of which is defined by the abutment plate 60. The abutment plate 60 is angled other than at 90° relative to the long leg 62 of the L-shaped plate so that the abutment plate 60 is vertical in the abutment position (as shown in FIG. 5) and so that the long leg 62 is horizontal and the short leg 64 is vertical when in the hook position illustrated in FIG. 4.

The support plates 56 of the push-pull means defining the chain and the coupler member 58 include retention means for retaining the coupler member 58 in the abutment position illustrated in FIG. 5. Specifically, the retention means includes a pair of ball detents supported on the side plates 68 of the coupler member with detent balls 70 biased toward but spaced from the inward surfaces of the adjacent support flanges of the support plates 56. The ball detents include threaded members 72 which threadedly engage the side plates 68 and have springs therein for urging the balls 70 outwardly and nuts 74 threaded onto the threaded member 72 for locking the threaded member 72 to prevent rotation thereof when in the proper adjusted position. There is included detent pockets 76 on the support flanges of the support plates 56 for receiving the balls 70 when in the abutment position illustrated in FIG. 5. The retention means also includes barrier means for requiring a predetermined additional rotational force applied to the coupler member 58 immediately before reaching the abutment position for preventing unintentional engagement of the retention means. Specifically, the barrier means comprises a raised projection 78 extending inwardly of the inward surfaces of the support flanges of the support plates 56 adjacent the detent pockets 76 so that the detent balls 70 must retract by engaging the projections 78 before reaching the detent pockets 76. The projections are defined by an annular member threaded into the support plates 56 and defining the detent pockets 76 therein, but yet projecting inwardly from the inward surfaces of the support plates 56.

There is also included camming means for disengaging the detents and for rotating the coupler member 58 to the hook position illustrated in FIG. 5. The camming means includes a downwardly extending cam section or plate 80 positioned to contact a sprocket tooth as the sprocket tooth enters the space between the support plates 56 to rotate the coupler member 58 to the hook position as illustrated in FIG. 4. The cam plate 80 extends rearwardly of the abutment plate 60 and downwardly of the L-shaped plate 62, 64 and is disposed midway between the support plates 56.

The coupler member 58 includes biasing means for urging the coupler member 58 to rotate to the hook position shown in FIG. 4. Specifically, the biasing means comprises a counterweight 82. The coupler member 58 is rotatably supported on a support shaft 84 which is attached to the support flanges of the support plates 56 as by welding, or the like, and extends through the side plates 68 of the coupler member 58 and through the the cam plate 80 for rotatably supporting the coupler member 58 for rotation about the axis of the shaft 84. The shaft 84 is disposed rearwardly of the abutment plate 60 so that the coupler member 58 is supported by the upper support flange of the support plates 56 for rotation about an axis disposed rearwardly of the abutment 60. The counterweight 82 interconnects the rearward ends of the side plates 68 and is disposed rearwardly of the axis of the support shaft 84.

The pull hook portion of the coupler member 58 includes a cam surface for engaging a tray to rotate the coupler member 58 from the hook position shown in FIG. 4 toward the abutment position shown in FIG. 5. The cam surface is defined by a triangular plate 86 extending forwardly of the central portion of the short leg 64 of the L-shaped plate.

A bridge plate 88 interconnects the upper extremities of the support flanges to rigidly interconnect the support plates 56 so that the support plates 56 cannot wobble and will stay parallel with one another.

OPERATION OF PREFERRED EMBODIMENT

The transfer car is moved along the rails 12 to a position in alignment with a selected processing station. The assembly would be in the position illustrated in FIG. 1. The controls 52 would control the drive mechanism for rotating the sprockets so that the coupler member 58 would be moved toward the tray 14, the coupler member 58 being in the hook position as shown in FIG. 4. As the coupler member 58 approaches the tray 14, the cam surface of the triangular plate 86 engages the lower edge of the tray forcing the coupler member 58 to rotate downwardly, but not sufficiently to engage the detent balls 70 in the pockets 76. Therefore, the coupler member 58 would rotate clockwise as viewed in FIG. 5 because of the counterweight 82, but upon continued movement, the abutment plate 60 would engage the tray 14 and upon continued movement of the chain would move the tray 14 to the left as viewed in FIG. 1. As the end 32 of the chain moves to the left, as viewed in FIG. 1, and moves down into the tracks 36 it clears a gate member 90 which would rotate downwardly. The gate member 90, being in the down position would engage the bottom of the rollers 28 on the leading end 34 of the chain, including the rollers 28 adjacent the coupling assembly 54. The rollers would then pass over the gate member 90 and out the tracks 92 into the processing station. Of course, once the abutment plate 60 has engaged the tray 14, the coupler member 58 is rotated to the abutment position as illustrated in FIG. 5 where the detent balls 70 engage the pockets 76 and maintain the coupler member 58 in the abutment position. Thus, when the leading end 34 of the chain is withdrawn from the processing station, the coupler member 58 is maintained in the abutment positiion shown in FIG. 5 where the hook portion defined by the short leg 64 will clear the tray leaving the tray within the processing station. Of course, as the chain is withdrawn from the processing station, the opposite end 32 will again engage the sprocket 22 and be entrained thereover and, in so doing, will raise the gate member 90.

Assuming that the tray is within the processing station and is to be withdrawn, the coupling member 58 will be in the hook position illustrated in FIG. 4 because it will have passed over a sprocket 24 whereby a tooth thereof engages the cam plate 80 to remove the coupling member 58 from the retention position or the abutment position whereby the counterweight 82 will rotate the coupler member 58 to the hook position illustrated in FIG. 4. The coupling assembly will move again into the processing station and, as it so engages the tray 14, the triangular cam member 86 will force the coupler member 58 to rotate toward the abutment position but not sufficiently to engage the detent balls 70 with the pockets 76. Thus, immediately after the hook portion has passed under the edge of the tray 14, the controls in the control panel 15 will stop the movement of the chain and the counterweight 82 will rotate the coupler member 58 to the hook position (as illustrated in FIG. 4) whereby the hook portion defined by the short leg 64 will engage the inner bottom edge of the tray 14 whereby, upon withdrawal of the chain from the processing station, the workpiece carrier tray will be withdrawn.

The importance of the barrier defined by the raised portion 78 surrounding the pockets 76 is that to prevent the unintentional or inadvertent movement of the coupler member 58 to the abutment position where it would be retained in the event that the engagement of the triangular cam member 86 with the bottom of the tray oscillated the coupler member 58 too far. The raised portion of the member 78 requires a greater force for engagement of the detent means thereby preventing such unintentional or undesirable retention in the abutment position.

Of course, although not shown, there may be a similar but oppositely facing coupling assembly 54 associated with the links adjacent the other end 32 of the chain in a similar spacial relationship as the coupling assembly 54 but for moving the tray 14 in the opposite direction out over the opposite end of the transverse car into a processing station on the opposite side of the tracks 12.

The invention has been described in an illustrative manner, and it is to be understood that the terminology which has been used is intended to be in the nature of words of description rather than of limitation.

Obviously, many modification and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A work transfer assembly comprising; transfer car means (10) movable along a path (12) for transporting a workpiece carrier tray (14) between separate processing stations (16) positioned along said path (12), said car means (10) including push-pull means for moving a tray (14) in directions laterally of said path (12) to move the tray (14) into and out of processing stations (16) said push-pull means characterized by a single unitary coupler member (58) having a push abutment (60) for abutting a tray (14) to push the tray (14) from said car means (10) to a station (16) and a pull hook (64) for hooking a tray (14) to pull the tray (14) from a station (16) to said car means (10) and rotatable between a hook position (FIG. 4) with said pull hook in position for hooking a tray (14) and an abutment position (FIG. 5) with said push abutment in position for abutting a tray (14) and said pull hook (64) in a nontray-engaging position.

2. An assembly as set forth in claim 1 wherein said push-pull means and said coupler member (58) include retention means (70, 72, 74, 76, 78) for retaining said coupler member (58) in said abutment position (FIG. 5).

3. An assembly as set forth in claim 2 wherein said push-pull means and said coupler member (58) include camming means (80) for disengaging said retention means and for rotating said coupler member (58) to said hook position (FIG. 4).

4. An assembly as set forth in claim 3 wherein said coupler member includes biasing means (82) for urging said coupler member (58) to rotate to said hook position (FIG. 4).

5. An assembly as set forth in claim 4 wherein said coupler member (58) defines a pocket with said pull hook (64) defining the forward extremity of said pocket and said push abutment (60) defining the rearward extremity of said pocket.

6. An assembly as set forth in claim 5 wherein said pull hook (64) includes a cam surface (86) for engaging a tray (14) to rotate said coupler member (58) from said hook position (FIG. 4) toward said abutment position.

7. An assembly as set forth in claim 6 wherein said retention means includes barrier means (78) for requiring a predetermined additional rotational force applied to said coupler member immediately before reaching said abutment position for preventing unintentional engagement of said retention means.

8. An assembly as set forth in claim 7 wherein said push-pull means includes a plurality of sprockets (22, 24) and a chain comprising a plurality of rotatably connected links (26) entrained about said sprockets (22, 24), one of said links comprising a pair of spaced support plates (56) with each of said support plates (56) having upwardly extending support flanges, said coupler member (58) being rotatably supported by and between said support flanges.

9. An assembly as set forth in claim 8 wherein said sprockets (22, 24) include sprocket teeth and said chain includes a roller (66) at the connection between adjacent links (26) for engaging said sprockets (22, 24) between teeth, said camming means including said teeth and a downwardly extending cam section (80) of said coupler member (58), said cam section (80) being positioned to contact a sprocket tooth as the sprocket tooth enters the space between said support plates (56) to rotate said coupler member (58) to said hook position (FIG. 4).

10. An assembly as set forth in claim 9 wherein said coupler member (58) is supported by said support flanges for rotation about an axis (84) disposed rearwardly of said push abutment (60).

11. An assembly as set forth in claim 10 wherein said biasing means (82) comprises a counterweight disposed rearwardly of said axis (84).

12. An assembly as set forth in claim 11 wherein said coupler member (58) includes a pair of spaced side plates (68) interconnected at the rear ends by said counterweight (82).

13. An assembly as set forth in claim 12 wherein said push abutment (60) is defined by an abutment plate interconnecting the front ends of said side plates (68) and the bottom (62) of said pocket and said pull hook (64) are defined by an L-shaped plate (62, 64) having a long leg (62) interconnecting said side plates (68) at the bottom of said abutment plate (60) and defining said bottom (62) and extending forwardly to an upwardly extending short leg (64) which defines said pull hook.

14. An assembly as set forth in claim 13 wherein said abutment plate (60) is angled relative to said long leg (62) of said L-shaped plate so that said abutment plate (60) is vertical in said abutment position (FIG. 5) and said long leg (62) is horizontal with said short leg (64) vertical in said hook position (FIG. 4).

15. An assembly as set forth in claim 14 wherein said retention means includes a pair of ball detents (70, 72, 74) supported on said side plates (68) with detent balls (70) biased into engagement with the inward surfaces of adjacent support flanges of said support plates (56) and detent pockets (76) on said support flanges for receiving said balls (70) in said abutment position (FIG. 6).

16. An assembly as set forth in claim 15 wherein said barrier means (78) of said retention means comprises a raised projection (78) extending inwardly from the inward surfaces of said support flanges adjacent said detent pockets (76) whereby said detent balls (70) must retract by engaging said projections (78) before reaching said detent pockets (76).

17. An assembly as set forth in claim 16 wherein said cam surface (86) of said pull hook comprises a triangular plate (86) extending forwardly of said short leg (64) of said L-shaped plate, said cam section (80) comprises a cam plate extending rearwardly of said abutment plate (60) and downwardly of said L-shaped plate (62, 64) and disposed between said support plates (68).

18. An assembly as set forth in claim 17 including a support shaft (84) attached to said support flanges of said support plates (56) and extending through said side plates (68) of said coupler member (58) and through said cam plate (80) for supporting said coupler member (58) for rotation about said axis (84).

19. An assembly as set forth in claim 18 including a bridge plate (88) rigidly interconnecting the upper extremities of said support flanges to rigidly interconnect said support plates (56).

20. A coupling assembly (54) of the type for moving a tray (14) into and out of a processing station (16) from a transfer car (10) which is movable along a path (12) between the stations (16) therealong, said assembly comprising; a pair of interconnected and spaced support plates (56) and a single unitary coupler member (58) having a push abutment (60) for abutting a tray (14) to push the tray (14) from the transfer car (10) to a station (16) and a pull hook (64) for hooking a tray (14) to pull the tray (14) from a station (16) to the transfer car (10) and rotatable between a hook position (FIG. 4) with said pull hook (64) in position for hooking a tray (14) and an abutment position (FIG. 5) with said push abutment (60) in position for abutting a tray (14) and said pull hook (64) in a nontray-engaging position.

21. An assembly as set forth in claim 20 including retention means (70, 72, 74, 76, 78) coacting between said support flanges (56) and said coupler member (58) for retaining said coupler member (58) in said abutment position (FIG. 5).

22. An assembly as set forth in claim 21 wherein said coupler member (58) includes camming means (80) for disengaging said retention means and for rotating said coupler member (58) to said hook position (FIG. 4).

23. An assembly as set forth in claim 22 wherein said coupler member (58) includes biasing means (82) for urging said coupler member (58) to rotate to said hook position (FIG. 4).

24. An assembly as set forth in claim 23 wherein said coupler member (58) defines a pocket with said pull hook (64) defining the forward extremity of said pocket and said push abutment (60) defining the rearward extremity of said pocket.

25. An assembly as set forth in claim 24 wherein said retention means includes barrier means (78) for requiring a predetermined additional rotational force applied to said coupler member (58) immediately before reaching said abutment position (FIG. 5) for preventing unintentional engagement of said retention means.

* * * * *